US012584331B2

(12) United States Patent
Kling et al.

(10) Patent No.: US 12,584,331 B2
(45) Date of Patent: Mar. 24, 2026

(54) ELECTRONIC LOCK ASSEMBLY FOR DISPENSER, AND ASSEMBLY METHOD

(71) Applicant: Essity Hygiene and Health Aktiebolag, Gothenburg (SE)

(72) Inventors: Robert Kling, Skene (SE); Per Möller, Borlänge (SE); Karl Walheim, Borlänge (SE); Michael Stevensson, Borlänge (SE)

(73) Assignee: ESSITY HYGIENE AND HEALTH AKTIEBOLAG, Gothenburg (SE)

( * ) Notice: Subject to any disclaimer, the term of this patent is extended or adjusted under 35 U.S.C. 154(b) by 5 days.

(21) Appl. No.: 18/708,350

(22) PCT Filed: Nov. 11, 2021

(86) PCT No.: PCT/EP2021/081373
§ 371 (c)(1),
(2) Date: May 8, 2024

(87) PCT Pub. No.: WO2023/083451
PCT Pub. Date: May 19, 2023

(65) Prior Publication Data

US 2024/0418007 A1 Dec. 19, 2024

(51) Int. Cl.
*E05B 47/00* (2006.01)
*E05B 65/00* (2006.01)

(52) U.S. Cl.
CPC ........ *E05B 47/0012* (2013.01); *E05B 65/006* (2013.01); *E05B 2047/0017* (2013.01)

(58) Field of Classification Search
CPC ............. E05B 47/0012; E05B 47/0669; E05B 47/0607; E05B 47/0634; E05B 65/006;
(Continued)

(56) References Cited

U.S. PATENT DOCUMENTS 3,837,195 A * 9/1974 Pelto .................. E05B 47/0038 70/276
5,771,722 A * 6/1998 DiVito .................. E05B 47/063 340/5.67
(Continued)

FOREIGN PATENT DOCUMENTS

CA 2816135 A1 * 11/2013 ............ E05B 65/47
CN 102046905 A 5/2011
(Continued)

OTHER PUBLICATIONS

JP200320215 Espacenet machine translation claims and description (Year: 2025).*
(Continued)

*Primary Examiner* — Steven A Tullia
(74) *Attorney, Agent, or Firm* — BUCHANAN INGERSOLL & ROONEY PC

(57) ABSTRACT

A lock assembly includes a lock housing including a top portion and a body portion; an operation part which is movably mounted in or on the lock housing, wherein the operation part is operable by a user for unlocking the lock assembly; a blocking member, provided for blocking movement of a part of the lock assembly, wherein the blocking member is movable between a non-blocking position and a blocking position, in which the blocking member blocks the movement of the part of the lock assembly; and an electric motor for driving the movement of the blocking member between the non-blocking position and the blocking position. The blocking member and the electric motor are included in a void underneath the operation part.

26 Claims, 13 Drawing Sheets

(58) Field of Classification Search

CPC ..... E05B 2047/0017; E05B 2047/0094; E05B 1/0038; E05B 13/002; E05B 5/006; E05B 13/105; E05B 17/0029; E05C 3/042; E05C 3/08; E05C 3/30; A47K 5/12; A47K 10/32; Y10T 70/8486; Y10T 292/0982; Y10T 292/0894; Y10T 292/0911; Y10T 292/0948

USPC ........................................................ 70/277

See application file for complete search history.

(56) References Cited

U.S. PATENT DOCUMENTS

| | | | | |
|---|---|---|---|---|
| 5,791,177 | A * | 8/1998 | Bianco | G07C 1/32 70/283.1 |
| 6,460,903 | B1 * | 10/2002 | Ming-Chih | E05B 47/068 292/172 |
| 7,698,919 | B2 * | 4/2010 | Kim | E05B 47/0642 70/277 |
| 8,020,902 | B1 * | 9/2011 | Li | G06F 1/20 292/DIG. 16 |
| 8,272,240 | B1 * | 9/2012 | Schilens | E05B 73/007 70/210 |
| 8,616,031 | B2 * | 12/2013 | Ullrich | E05B 47/0676 70/279.1 |
| 9,208,628 | B2 | 12/2015 | Gokcebay | |
| 9,222,284 | B2 * | 12/2015 | Gokcebay | E05B 47/0012 |
| 10,487,542 | B2 * | 11/2019 | Vetter | E05C 3/06 |
| 10,829,968 | B2 * | 11/2020 | Topfer | E05B 79/20 |
| 11,021,894 | B1 * | 6/2021 | Zastrow | E05B 47/0012 |
| 11,156,017 | B1 * | 10/2021 | Zhang | E05B 65/025 |
| 11,255,108 | B2 * | 2/2022 | Leung | E05B 47/0012 |
| 11,952,801 | B2 * | 4/2024 | Snodgrass | E05B 47/0642 |
| 12,383,104 | B2 * | 8/2025 | Kling | E05C 3/14 |
| 12,392,165 | B2 * | 8/2025 | Carson | E05B 47/0012 |
| 2003/0084691 | A1 * | 5/2003 | Kato | G07C 9/00309 70/278.3 |
| 2008/0078220 | A1 * | 4/2008 | Kim | E05B 47/0642 70/283.1 |
| 2009/0115196 | A1 * | 5/2009 | Stango | E05B 47/0692 292/61 |
| 2011/0024425 | A1 | 2/2011 | Herrmann et al. | |
| 2011/0083482 | A1 | 4/2011 | Goldman | |
| 2011/0120200 | A1 | 5/2011 | Eriksson | |
| 2011/0203331 | A1 * | 8/2011 | Picard | E05B 47/0046 29/829 |
| 2013/0292417 | A1 * | 11/2013 | Pelkey | E05B 13/002 74/491 |
| 2016/0145904 | A1 * | 5/2016 | Lowder | E05B 47/0001 292/145 |
| 2016/0319569 | A1 * | 11/2016 | Johnson | E05B 39/04 |
| 2019/0330891 | A1 | 10/2019 | Paré | |
| 2019/0390480 | A1 * | 12/2019 | Pukari | E05B 47/0006 |
| 2021/0140200 | A1 | 5/2021 | Ufkes et al. | |
| 2021/0230905 | A1 * | 7/2021 | Loon | E05C 3/042 |
| 2021/0304536 | A1 * | 9/2021 | Chan | E05B 13/004 |
| 2022/0195754 | A1 * | 6/2022 | Chen | E05B 47/0012 |

FOREIGN PATENT DOCUMENTS

| | | | | |
|---|---|---|---|---|
| CN | 105484580 | B * | 2/2018 | E05B 15/04 |
| CN | 106088829 | B * | 9/2018 | E05B 15/00 |
| CN | 110094117 | A * | 8/2019 | E05B 49/00 |
| DE | 3836527 | A1 * | 5/1990 | E05B 13/105 |
| DE | 202005021438 | U1 * | 2/2008 | E05B 81/90 |
| DE | 202016102225 | U1 * | 6/2016 | E05C 3/042 |
| DE | 102014202362 | B4 * | 12/2018 | F24C 15/022 |
| DE | 102018133069 | A1 * | 6/2020 | E05B 1/0038 |
| EP | 0744519 | A1 * | 11/1996 | E05B 1/0038 |
| EP | 2107186 | B1 * | 6/2011 | E05B 1/0038 |
| EP | 2313582 | B1 * | 9/2017 | G07C 9/0094 |
| EP | 3656953 | A1 * | 5/2020 | H02K 11/0094 |
| JP | 2000320215 | A * | 11/2000 | E05B 65/52 |
| JP | 3076588 | U * | 4/2001 | E05N 47/00 |
| KR | 20090012342 | U * | 12/2009 | E05B 47/0012 |
| WO | 2009123558 | A1 | 10/2009 | |
| WO | 2013165994 | A1 | 11/2013 | |
| WO | WO-2020112459 | A1 * | 6/2020 | E05C 3/042 |
| WO | 2021055951 | A2 | 3/2021 | |

OTHER PUBLICATIONS

International Search Report (PCT/ISA/210) and Written Opinion (PCT/ISA/237) mailed on Jul. 25, 2022, by the European Patent Office as the International Searching Authority for International Application No. PCT/EP2021/081373. (11 pages).

Office Action issued in Chinese Patent Application No. 2021801037641, dated Jan. 29, 2026, with English Translation (25 pages).

* cited by examiner

Fig. 5C
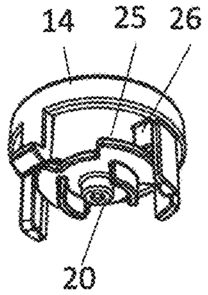
Fig. 6C
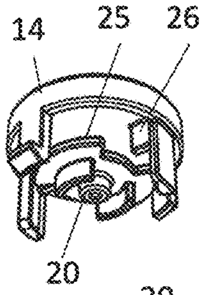
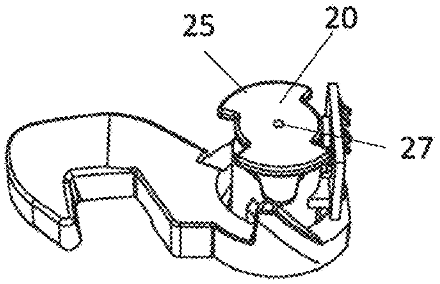
Fig. 5D
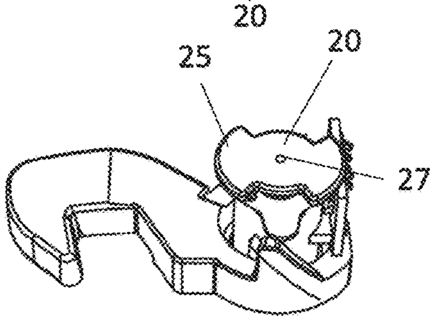
Fig. 6D

ELECTRONIC LOCK ASSEMBLY FOR DISPENSER, AND ASSEMBLY METHOD

FIELD OF THE DISCLOSURE

The present disclosure relates to a lock assembly for a dispenser. In particular, the present disclosure relates to a lock assembly for locking/unlocking an openable part of a housing of the dispenser, so as to restrict access to the interior of the dispenser to authorized users. The disclosure further relates to a method for assembling such a lock assembly.

BACKGROUND ART

Dispensers for some consumable products, such as paper towel products, liquid soap, and the like, may require access to the interior of the dispenser in order to be able to remove or refill the product periodically. Depending on where the dispenser is located, such as in a public area, it may be further required that the dispenser be locked to prevent unauthorized persons from having access to remove the entire contents of the dispenser.

Thus, dispensers are often equipped with a mechanical lock assembly that locks the housing of the dispenser. The housing can then only be unlocked by means of a key or the like. For example, only authorized people, like cleaning staff, janitor, or the like, have the key to unlock and lock the hygiene equipment.

Often, also electronic lock assemblies are used which comprise electronics in addition to the mechanical lock assemblies. The electronic lock assembly can transmit and receive data and can be put, for example, in a locking or unlocking state by means of signals instead of keys or the like. For example, the cleaning staff may have an application installed on a mobile device, smartphone, tablet, or the like and can choose to lock or unlock the dispenser using the application. When the cleaning staff chooses to unlock the dispenser using the mobile device or the like, an unlock signal may be transmitted from the mobile device to the lock assembly installed in the dispenser, to unlock the housing. When the cleaning staff chooses to lock the dispenser using the mobile device or the like, a lock signal may be transmitted from the mobile device to the lock assembly installed the dispenser, to lock the housing.

Known electronic lock assemblies may have one or more of the following disadvantages.

Known electronic lock assemblies may be bulky, taking up a lot of space in the dispenser housing.

Sometimes it is desirable to retrofit an existing dispenser, i.e. replace a mechanical lock with an electronic lock assembly. Known electronic lock assemblies are generally not designed for this purpose, leading to a need to replace the complete dispenser if one wants to upgrade from a mechanical locking system to an electronic locking system.

It is known to provide electronic lock assemblies with some sort of alternative mechanism by means of which the lock can still be opened mechanically in cases of power failure. However, such alternative mechanisms may involve a risk of unauthorized users gaining access to the dispenser.

SUMMARY

It may be an aim of the present disclosure to provide an electronic lock assembly for a dispenser, wherein the electronic lock assembly has a compact construction.

It may be an aim of the present disclosure to provide an electronic lock assembly for a dispenser, wherein the electronic lock assembly has a construction allowing it to be retrofitted to existing dispensers and/or which can be assembled in an easy way.

It may be an aim of the present disclosure to provide an electronic lock assembly for a dispenser, wherein the electronic lock assembly has an alternative mechanism for unlocking the lock assembly in case of power failure.

In an aspect, the disclosure provides a lock assembly, provided for being mounted in an opening in a dispenser housing and locking an openable part of the dispenser housing, the lock assembly comprising: a lock housing comprising a top portion which is provided to be mounted on or in the opening in the dispenser housing and a body portion which extends downwards with respect to the top portion; and an operation part which is movably mounted in or on the lock housing, wherein the operation part is operable by a user for unlocking the lock assembly. This means that the operation part is accessible to the user from the outside of the lock housing in such a way that the user can move it and thereby unlock the lock assembly.

The lock assembly according to the present disclosure comprises an electronic blocking mechanism or blocking means, comprising a blocking member with an electric drive means, preferably remotely controllable, for selectively enabling or disabling operation of the lock assembly. In embodiments, the blocking mechanism may comprise: a blocking member, provided for blocking or preventing movement of a part of the lock assembly such that unlocking of the lock assembly by user operation of the operation part is prevented, wherein the blocking member is movable between a non-blocking position, in which unlocking of the lock assembly by user operation of the operation part is enabled, and a blocking position, in which the blocking member blocks or prevents the movement of said part of the lock assembly; and an electric motor for driving the movement of the blocking member between the non-blocking position and the blocking position.

In embodiments according to the disclosure, the electric motor and the blocking member may be included in a void underneath the operation part.

In embodiments according to the disclosure, the operation part may take up, or define a certain volume inside the lock housing and the electric motor and the blocking member may be contained within said volume.

In embodiments according to the disclosure, a footprint of the operation part may define a volume inside the body portion and the blocking member and the electric motor may be provided within said volume.

In this way, a simple and compact construction may be achieved for a lock assembly with a blocking mechanism for blocking operation of the lock assembly.

In embodiments according to the disclosure, the lock assembly may further comprise: a latch which is movably mounted in the body portion of the lock housing, the latch being movable from a locked position to an unlocked position as a result of a user operation of the operation part for unlocking the lock assembly; a resilient member which biases the latch towards the locked position; and a motion transfer mechanism, provided for mechanically transferring motion of the operation part to the latch, such that the user operation of the operation part results in the movement of the latch from the locked position to the unlocked position.

In embodiments according to the disclosure, the blocking member may be provided for, in the blocking position, engaging said part of the lock assembly. The blocking member may be provided for engaging a portion of the operation part, a portion of the latch, and/or a portion of the motion transfer mechanism. The blocking member may engage the part in such a way that movement is blocked, at least to some extent, such that the latch cannot be moved into the unlocking position anymore.

In embodiments, the blocking member may be provided for blocking movement of the operation part such that it cannot be operated anymore for unlocking the lock, i.e. the movement of the operation part by the user for unlocking the lock is blocked. For example, the blocking member may be provided for, in the blocking position, engaging a portion of the operation part in order to prevent its operation.

In embodiments, the blocking member may be provided for blocking movement of the latch, such that when the user operates the operation part for unlocking the lock, the movement of the latch is blocked and it cannot be moved into the unlocked position. For example, the blocking member may be provided for, in the blocking position, engaging a portion of the latch in such a way that the latch cannot be moved into the unlocked position.

With the "motion transfer mechanism" is meant the components or parts which together achieve that the movement of the operation part is mechanically transferred onto the latch, such that the user operation of the operation part results in a movement of the latch from the locked to the unlocked position. In embodiments, the blocking member may be provided for blocking movement of the motion transfer mechanism, i.e. any part, component, or portion of this mechanism, such that the movement of the operation part and/or the latch is at least partially blocked, i.e. at least in such a way that the latch cannot be moved into the unlocked position. Alternatively or in combination, the blocking member may disengage parts in the motion transfer mechanism resulting in that the operation part no longer can influence the movement of a latch.

In an aspect, which may be combined with the other aspects and embodiments described herein, the blocking member and the electric motor may be provided underneath the operation part and inside the volume of the body portion. This means that the blocking mechanism, i.e. the blocking member and its electric drive means, are located underneath the operation part and are entirely contained within the volume of the body portion. In this way, a compact construction of the lock assembly may be achieved and/or it may be achieved that the lock assembly, including the (remotely controllable) blocking means, can be inserted into an existing hole in the wall of a dispenser housing, or in other words that existing dispensers can be retrofitted with a new lock assembly according to the present disclosure. Further, a power efficient blocking mechanism may be achieved. The resilient member, which biases the latch to the locked position, also biases the the operation part to its initial position and away from the blocking member. In this way the blocking member can be rotated by the electric motor without any obstruction or friction, so that the electric motor consumes little power when moving the blocking member.

In embodiments, the central opening of the top portion, in which the operation part is provided, may define a cylindrical volume inside the body portion, and the blocking member and the electric motor may be provided within said cylindrical volume, i.e. entirely contained therein. For example, the operation part may be a circular push button and the blocking member and the electric motor may be entirely contained underneath and within the surface area of this circular push button. The push button may also have another shape than circular. More generally, a footprint of the operation part, which is mounted in the central opening of the lock housing, may define a volume inside the body portion, and the blocking member and its electric drive means such as the electric motor are preferably entirely contained within said volume. With the footprint of the operation part is meant the area of the top surface of the operation part or the size (diameter/dimensions) of the central opening in the lock housing. This may contribute to the compactness and the ability of retrofitting existing dispensers with the new lock assembly.

In an aspect, which may be combined with the other aspects and embodiments described herein, the blocking member may be a rotatable member positioned closely underneath the operating element, and the blocking member may comprise at least one magnetic element. In this way, an alternative, safer, mechanism for unlocking the lock assembly in case of power failure may be achieved. In case of power failure, the blocking member can still be moved by means of an appropriately placed external magnet.

In embodiments, the operation part may be a push button having at least one stop surface facing downwards, i.e. away from the top surface of the push button. In embodiments, the blocking member may be a rotatable member having at least one blocking protrusion. The number of blocking protrusions may correspond to the number of stop surfaces. The rotatable member may be positioned such that the blocking protrusions can be rotated into and out of the way of the stop surfaces. In other words, in the non-blocking position of the blocking member, the blocking protrusion(s) is/are positioned out of the movement path of the stop surface(s), thus allowing operation of the lock assembly by means of the push button, and in the blocking position of the blocking member, the blocking protrusion(s) is/are positioned into the movement path of the stop surface(s), thus disabling operation of the lock assembly by means of the push button.

In embodiments, the drive shaft of the electric motor may be oriented perpendicular to the top surface of the push button, or parallel to a movement axis of the push button, and the blocking member may be mounted on the drive shaft of the electric motor. In this way, the blocking member and the electric motor may be mounted underneath the push button, and a simple and compact construction may be achieved.

In embodiments, the electric motor may be a stepper motor. In this way, the position of the blocking member may be easily controlled and the controller may receive a feedback on the position of the blocking member if the stepper motor comprises an encoder. Alternatively, or in combination, feedback about the position of blocking member may be obtained by a microswitch placed in proximity of the blocking member, such that the unblocked position of the blocking member may be detected by the microswitch.

In an aspect, which may be combined with the other aspects and embodiments disclosed herein, the lock assembly, in particular the body portion of the lock housing, may have predetermined dimensions for insertion into a hole of a given size, such that existing dispensers can be retrofitted with the lock assembly. In embodiments, the lock assembly may comprise a further housing which contains power and communication means, for example a compartment for receiving one or more batteries and a transceiver for wireless communication with external units, and a cable for connecting the lock housing with the further housing and transferring electric power and communication signals. The cable may be connectable to the lock housing by means of an interface. In this way, assembly of the lock and/or mounting the lock assembly on a dispenser may be facilitated, because the pre-assembled unit comprising the lock housing with the operation part and the latch can be mounted in a first step on the dispenser housing and the further housing can be mounted in a subsequent step. It suffices to connect the cable afterwards, in order to enable the transfer of power and communication signals. Also, the use of space inside the dispenser housing may be optimized, because the part containing the power source (e.g. batteries), which is usually more bulky, can be mounted spaced from the position of the lock. Further, the location of the further housing in the dispenser housing may be chosen so as to optimize the connection for the wireless communication.

In embodiments, the connection of the cable interface onto the lock housing may be a releasable connection. The releasable connection may be embodied in many different ways, preferably comprising a resilient part on the end of the cable and a corresponding recess or ridge in or on the lock housing, or vice versa. In embodiments, a snap gripping member may be provided on the end of the cable comprising the interface, for fixing the position of the interface on the lock housing. The snap gripping member may for example be a resilient hook and may be provided for engaging a corresponding recess in the lock housing, so that the interface is held in place on the lock housing.

In embodiments, a controller for controlling the operation of the electric motor, and thus the position of the blocking member, may be provided. The controller may be provided in or on the lock housing, or in or on the further housing.

In an aspect, which may be combined with the other aspects and embodiments disclosed herein, the lock assembly may have a body portion composed of at least two parts, for example a first part and a second part, wherein the first part is a main part which may be integral with the top portion of the lock housing and the second part is fixable onto the first part and is provided for receiving or pre-assembling at least the latch, the electric motor and the blocking member. This means that the latch, the electric motor and the blocking member may be first assembled on this second part of the lock housing and that the resulting combination of parts are subsequently mounted—together, as a single unit—on the first part of the lock housing. In this way, assembly of the lock assembly may be facilitated and a simple construction may be achieved.

In embodiments, the first and second parts of the lock housing may be fixed to each other by means of the operation part. This means that the first and second parts fit into or onto each other, but that their position into or onto each other is only fixed by assembling the operation part into or onto the lock housing. In other words, when the operation part is assembled onto the lock housing, for example placed in the central opening of the lock housing, the operation part holds the first and second parts together, i.e. the second part (and the parts pre-assembled onto it) cannot be removed from the first part. To this end, the operation part may for example comprise a pair of legs which slide into corresponding slots in the second part of the lock housing and thereby prevent the second part from being removed from the lock assembly.

In embodiments, the operation part may be provided for being snap-fitted into or onto the lock housing. For example, the operation part may comprise at least one resilient leg which snap-fits into a complementary groove in the first part of the lock housing.

In embodiments, the second part may further be provided for receiving or pre-assembling the resilient member which biases the latch towards the locked position. This resilient member may for example be a torsion spring. This resilient member may also be pre-assembled on the second part of the body portion.

In further aspects, the disclosure further extends to any dispenser comprising a dispenser housing having an interior volume for holding a dispensable product, the dispenser housing having an openable part to provide access to the interior volume for refilling the dispensable product, and a lock assembly according to the aspects and/or embodiments mentioned herein.

It is further an aspect of the present disclosure to provide a method of retrofitting an existing dispenser, which is for example provided with a purely mechanical lock, with an electronic lock assembly as disclosed herein in other aspects and/or embodiments. The method may comprise the steps of removing a lock from the dispenser housing, thereby clearing an opening in the dispenser housing, and mounting the electronic lock assembly as disclosed herein in the opening.

In embodiments, wherein the lock assembly has a body portion composed of at least two parts, for example a first part and a second part, wherein the first part is a main part which may be integral with the top portion of the lock housing and the second part is fixable onto the first part and is provided for receiving or pre-assembling at least the latch, the electric motor and the blocking member, the method may further comprise the steps of: (a) pre-assembling the latch, the electric motor and the blocking member on the second part of the body portion, thus forming a pre-assembled unit, (b) mounting the first part of the body portion of the lock housing on the dispenser housing, and (c) assembling the pre-assembled unit to the first part of the body portion.

In embodiments, wherein the lock assembly comprises the further housing which contains the power and communication means and a cable for connecting the lock housing with the further housing and transferring electric power and communication signals, the method may further comprise the step of mounting the further housing inside the dispenser housing.

In embodiments, wherein the connection of the cable interface onto the lock housing is a releasable connection and comprises a snap gripping member for fixing the position of the interface on the lock housing, the method may further comprise the step of connecting the cable interface onto the lock housing by means of the snap gripping member. In other embodiments, other ways of connecting the cable interface onto the lock housing may be provided, or the cable may have a permanent connection to the lock housing and, possibly, a releasable connection to the further housing.

In a further aspect, which may be combined with the other aspects and embodiments described herein, a method of assembling a lock assembly is provided, wherein the lock housing has a body portion composed of at least two parts, for example a first part and a second part, wherein the first part is a main part which may be integral with the top portion of the lock housing and the second part is fixable onto the first part. The method may comprise the steps of: (a) pre-assembling at least the electric motor and the blocking member, preferably also the resilient member and the latch, on the second part of the body portion, thus forming a pre-assembled unit, (b) assembling the pre-assembled unit to the first part of the body portion, and (c) assembling the operation part to the lock housing, thereby fixing the first and second parts onto each other.

BRIEF DESCRIPTION OF THE DRAWINGS

The present disclosure will be discussed in more detail below, with reference to the attached drawings.

FIG. 5A-5D show views of parts of an electronic lock assembly with the blocking member in the blocking position.

FIG. 6A-6D show views of parts of an electronic lock assembly with the blocking member in the non-blocking position.

DESCRIPTION OF EMBODIMENTS

Figure 1:
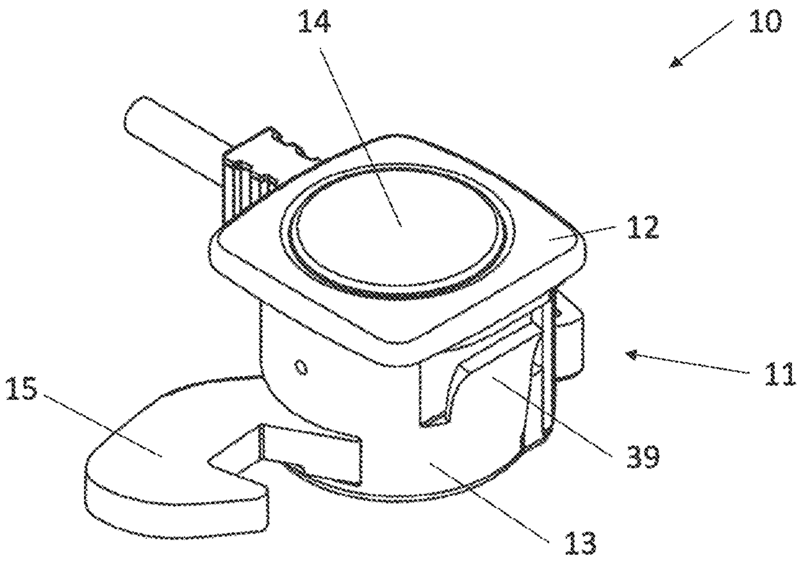
FIG. 1 shows a perspective view of an embodiment of an electronic lock assembly according to the disclosure.

The present disclosure will be described with respect to particular embodiments and with reference to certain drawings but the disclosure is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the disclosure.

Furthermore, the terms first, second, third and the like in the description and in the claims, are used for distinguishing between similar elements and not necessarily for describing a sequential or chronological order. The terms are interchangeable under appropriate circumstances and the embodiments of the disclosure can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the disclosure described herein can operate in other orientations than described or illustrated herein.

Furthermore, the various embodiments, although referred to as "preferred" are to be construed as exemplary manners in which the disclosure may be implemented rather than as limiting the scope of the disclosure.

Different aspects of the present disclosure will be described more fully hereinafter with reference to the enclosed drawings. The embodiments disclosed herein can, however, be realized in many different forms and should not be construed as being limited to the aspects set forth herein.

General Overview

Figure 2:
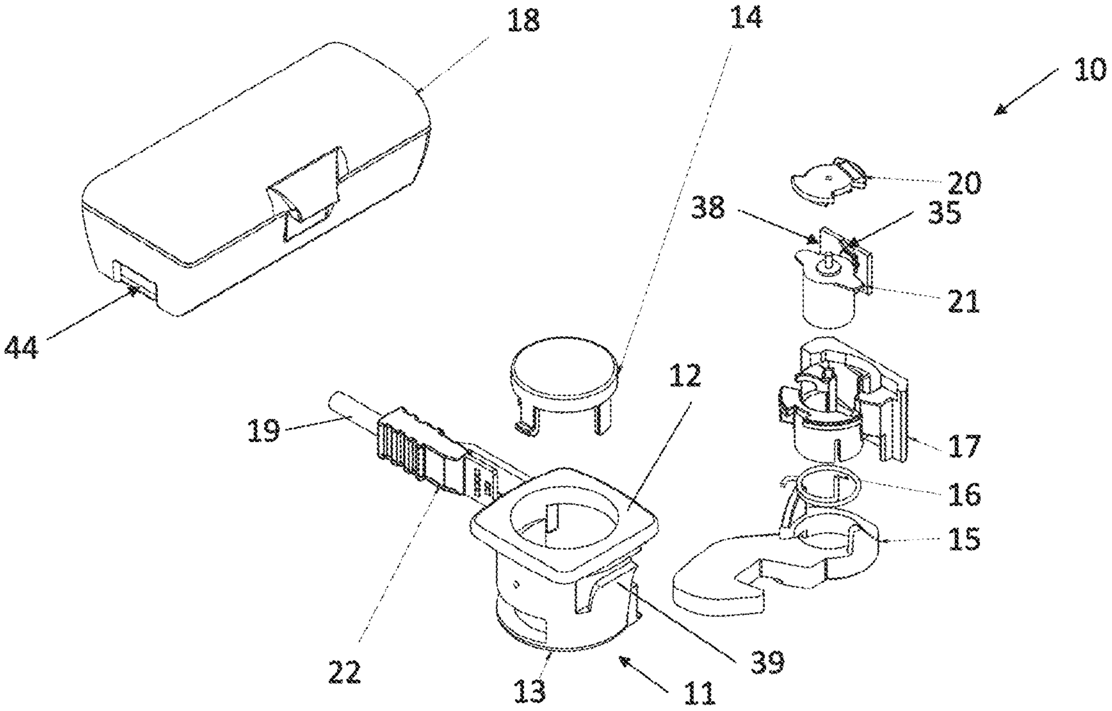
FIG. 2 shows an exploded view of an embodiment of an electronic lock assembly according to the disclosure.

FIG. 1 shows a perspective view of a lock assembly according to the disclosure. FIG. 2 shows an exploded view of this lock assembly. The lock assembly is provided for being mounted in an opening in a dispenser housing and locking an openable part of the dispenser housing. To this end, the lock assembly 10 comprises a lock housing 11 comprising a top portion 12 which is provided to be mounted in or on an opening in the dispenser housing and a body portion 13 which extends downwards with respect to the top portion and is dimensioned for insertion into the opening in the dispenser housing. In particular, the body portion 13 may be dimensioned for being inserted through the opening in the dispenser housing, i.e. have predetermined dimensions which make it possible to pass the body portion through an opening of a given, known size.

The lock assembly comprises an operation part 14, in particular a push button, which is movably mounted in the lock housing. In particular, the push button is in an initial position and can be depressed by a user to a depressed position. The operation part is provided in a central opening of the top portion and is operable by a user for unlocking the lock assembly. A latch 15 is movably mounted in the body portion of the lock housing, the latch being movable, in particular rotatable, from a locked position to an unlocked position as a result of a user operation of the operation part for unlocking the lock assembly. A resilient member 16, in particular a torsion spring, biases the latch to the locked position and thereby pushes the operation part back to the initial position. A motion transfer mechanism is provided for mechanically transferring motion of the operation part to the latch, such that the user operation of the operation part results in the movement of the latch from the locked position to the unlocked position. This will be explained below with reference to FIGS. 3-4.

The lock assembly according to the present disclosure comprises an electronic blocking mechanism or blocking means, comprising a blocking member with an electric drive means or actuator, preferably an electric motor, for selectively enabling or disabling operation of the lock assembly. According to the disclosure, these components are included in a void underneath the operation part. This will be explained below with reference to FIGS. 5-6.

The lock assembly according to the present disclosure may comprise a further housing 18 which contains power and communication means, for example a compartment for receiving one or more batteries and a transceiver for wireless communication with external units, and a cable 19 for connecting the lock housing with the further housing and transferring electric power and communication signals. The further housing 18 may comprise a connection port 44 for receiving an interface at one end of the cable 19, i.e. the cable 19 may be releasably connectable to the further housing. In embodiments, the cable 19 may also be permanently connected to the further housing 18. The other end of the cable 19 may be releasably connectable to the lock housing by means of an interface 22. In this way, assembly of the lock and/or mounting the lock assembly on a dispenser may be facilitated, because the unit comprising the lock housing 11, the operation part 14 and the latch 15 can be mounted in a separate step on the dispenser housing, separate from the mounting of the further housing 18. The two housing may be connected to each other afterwards by means of the cable 19, in order to enable the transfer of power and communication signals. Also, the use of space inside the dispenser housing may be optimized, because the further housing 18 which contains the power source (e.g. batteries) and which is usually more bulky can be mounted spaced from the position of the lock housing 11. Further, the location of the further housing 18 in the dispenser housing may be chosen so as to optimize the connection for the wireless communication.

Figure 8A:
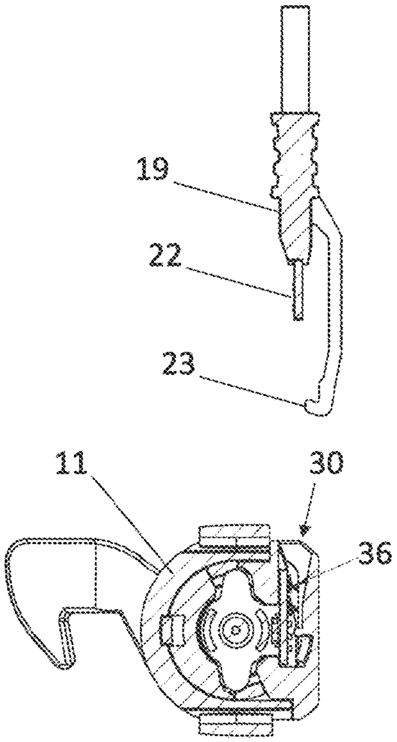
FIG. 8A-B show views of a cable interface disconnected from and connected to the lock housing.
Figure 8B:
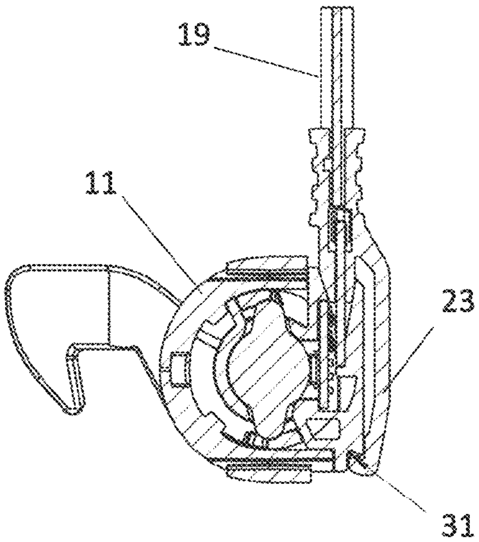

The connection of the cable interface 22 onto the lock housing 11 may be a releasable connection. The releasable connection may be embodied in many different ways, preferably comprising a resilient part on the end of the cable and a corresponding recess or ridge in or on the lock housing, or vice versa. As in the embodiments shown in the drawings, a snap gripping member 23 may be provided on the end of the cable comprising the interface 22, for fixing the position of the interface on the lock housing. The snap gripping member 23 may for example be a resilient hook which grips around a portion of the lock housing and engages a corresponding recess or ridge in or on the lock housing, preferably on the opposite side of the lock housing from where the interface is connected to the lock housing. In this way, it can be ensured that the interface is held in place on the lock housing. This will be explained below with reference to FIG. 8.

Figure 12A:
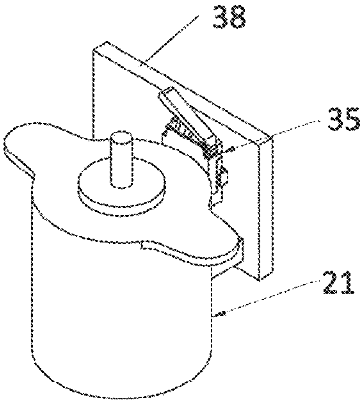
FIG. 12A-B shows some details of how the motor interfaces with the cable.
Figure 12B:
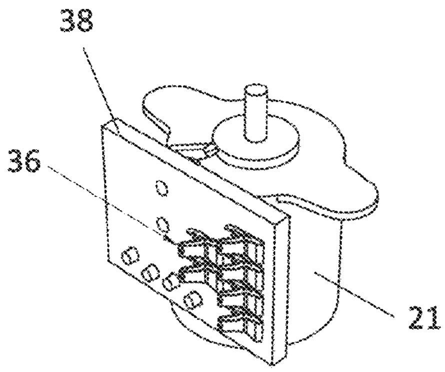

The electronic lock assembly comprises a controller for controlling the operation of the electric motor 21, and thus the position of the blocking member 20. The controller may be provided in or on the lock housing 11 or in or on the further housing 18, preferably in the further housing 18. Optionally, a sensing means may be provided in the lock housing for sensing the position of the blocking member 20, i.e. for sensing whether it is in the blocking position or in the non-blocking position. Such a sensing means may for example be provided by a microswitch 35 (See FIG. 12A) which is pushed by the blocking member 20 when that is moved to the blocking position.

Blocking Mechanism

The lock assembly according to the present disclosure comprises an electronic blocking mechanism or blocking means, comprising a blocking member 20 with an electric drive means or actuator, preferably remotely controllable, for selectively enabling or disabling operation of the lock assembly by moving the blocking member between blocking and non-blocking positions. In the embodiments shown in the drawings, the blocking mechanism comprises a blocking member 20, which is provided for blocking or preventing movement of a part of the lock assembly such that unlocking of the lock assembly by user operation of the operation part is prevented, in particular the operation part (push button) 14. The movement of the blocking member 20 is driven by means of an electric motor 21, in particular a stepper motor, which moves the blocking member between the non-blocking position and the blocking position according to control signals received from the controller of the electronic lock assembly.

In the embodiment shown in the drawings, the blocking member 20 is provided for, in the blocking position, blocking the movement of the operation part (push button) 14, so that the user cannot depress it from the initial position to the depressed position. In other embodiments, or in combination, the blocking member may be provided for engaging a portion of the operation part, a portion of the latch, and/or a portion of the motion transfer mechanism which transfers movement from the operation part to the latch. The blocking member may engage or block any of these parts in order to achieve that the movement is blocked, at least to some extent, such that the latch cannot be moved from the locked position into the unlocked position anymore.

Figure 5A:
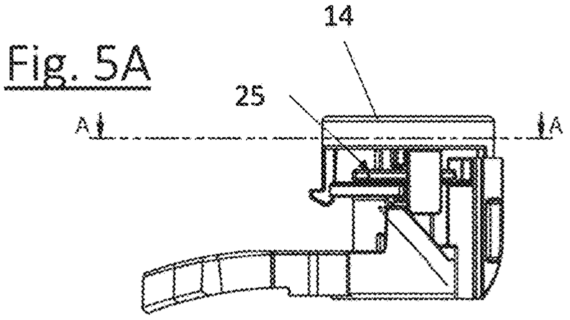
Figure 6A:
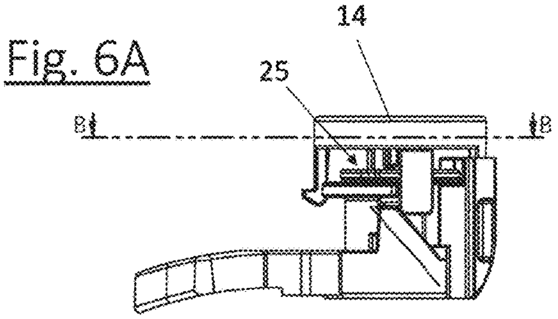
Figure 5B:
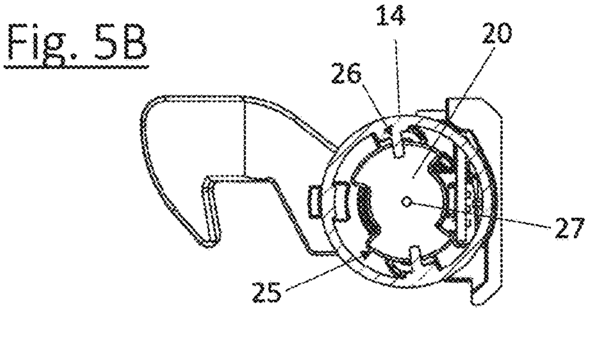
Figure 6B:
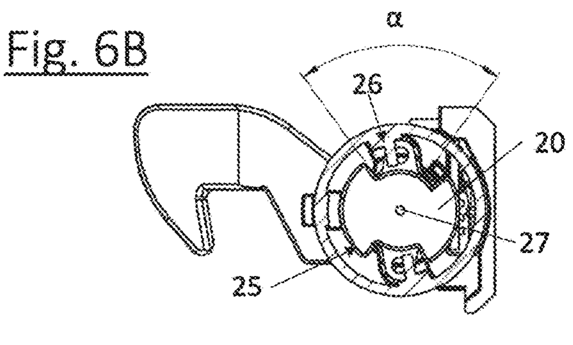
Figure 7A:
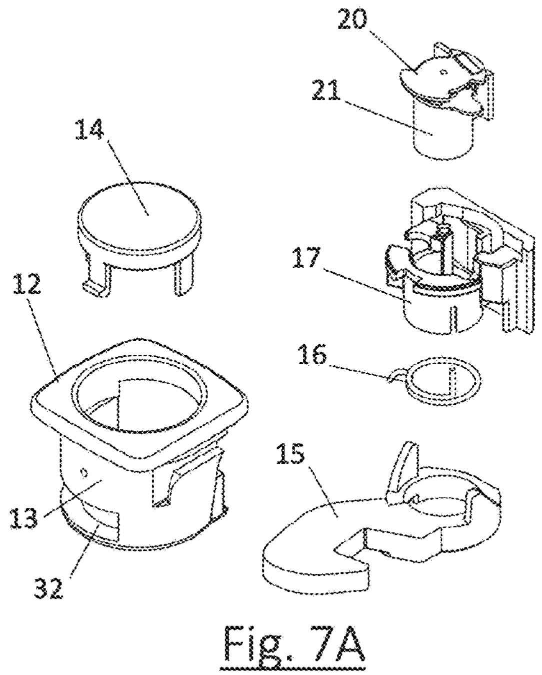
FIG. 7A-D show views of a method of assemblage of an electronic lock assembly according to the disclosure.
Figure 7B:
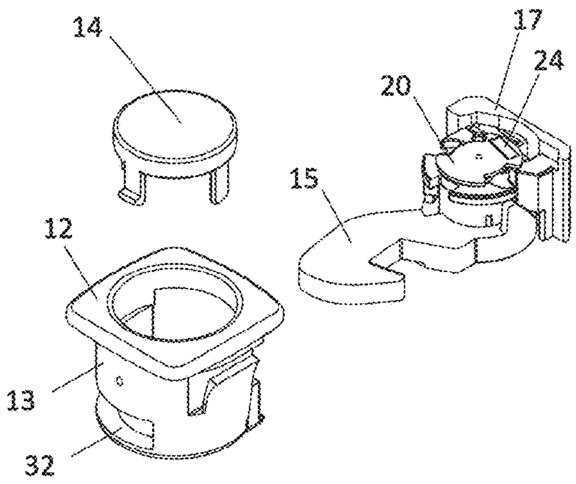
Figures 7C, 7D:
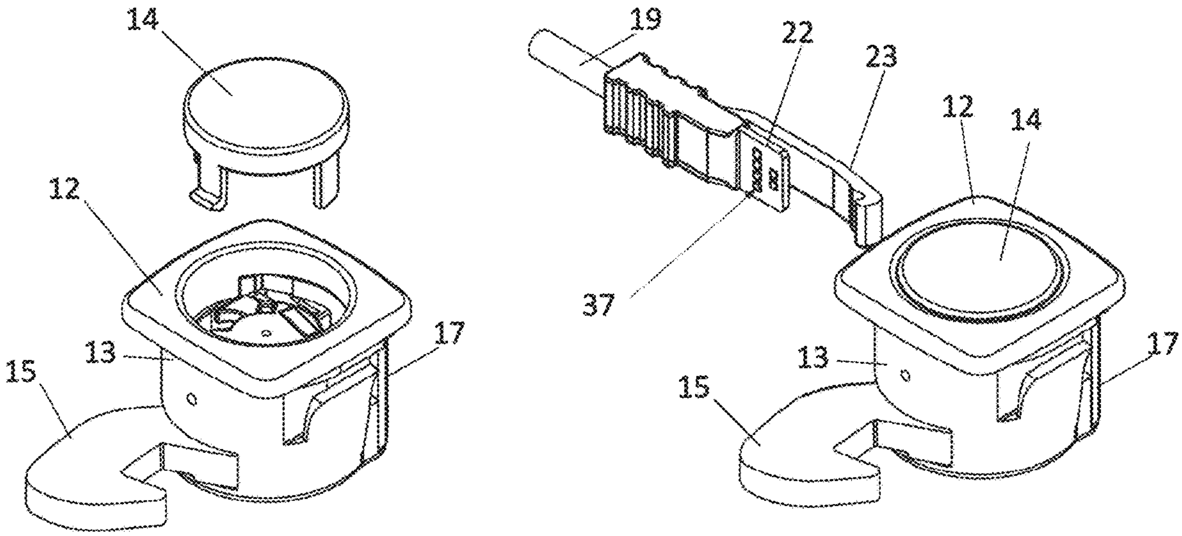

As mentioned above, the blocking member 20 is movable between a non-blocking position (FIG. 6A-D), in which unlocking of the lock assembly by user operation of the operation part 14 is enabled, and a blocking position (FIG. 5A-D), in which the blocking member blocks or prevents the movement of the operation part of the lock assembly. FIG. 6A shows a side view of the relevant parts of the lock assembly in the non-blocking position. FIG. 6B shows a cross-sectional view, taken along the plane A-A and viewed from above. FIGS. 6C and 6D show perspective views. In this non-blocking position, the electric motor 21 has moved the blocking member 20 to the non-blocking position and the blocking member 20 does not block the downwards movement of the operation part 14. In other words, the blocking member 20 allows the operation part 14 to move freely from its initial position to the depressed position (by force applied by the user) and back (by force resulting from the torsion spring), and as a result the movement of the latch from the locked position to the unlocked position (resulting from the force applied by the user) and back (by means of the torsion spring). In particular, the blocking member 20 has two wings, which protrude sideways on opposite sides of the drive shaft. In the non-blocking position, these wings are positioned out of the way of stop ribs 26 which are provided on the operation part 14, in particular extending downwards from the top surface. FIG. 5A shows a side view of the relevant parts of the lock assembly in the blocking position. FIG. 5B shows a cross-sectional view, taken along the plane B-B and viewed from above. FIGS. 5C and 5D show perspective views. In this blocking position, the electric motor 21 has moved the blocking member 20 to the blocking position and the blocking member 20 blocks the downwards movement of the operation part 14. In other words, the blocking member 20 does not allow the operation part 14 to be moved from its initial position towards the depressed position. As a result, the movement of the latch from the locked position to the unlocked position is prevented. In particular, in the blocking position, the wings 25 of the blocking member 20 obstruct the stop ribs 26 which are provided on the operation part 14, such that the stop ribs 26 contact the wings when the operation part 14 is pushed down by the user.

In the embodiment shown, the movement of the blocking member 20 from the non-blocking to the blocking position is a rotation over an angle α which corresponds to one or more steps of the stepper motor 21. For moving the blocking member 20 back to the non-blocking position, the electric motor is controlled to rotate in the opposite direction. In embodiments, the angle α over which the blocking member is rotated for movement between blocking and non-blocking positions may be different, depending on the number of steps of the stepper motor and/or the number of steps used for rotation from the non-blocking to the blocking position and vice versa.

In the embodiment shown, in the initial position of the operation part 14 there is a small clearance between the blocking member 20 and the stop ribs 26, so that the motor 21 can move the blocking member 20 substantially without friction. In this way, energy consumption can be minimized and battery life can be prolonged.

In embodiments, the electric motor, or other electric actuator such as for example a solenoid, may be provided to impart a different movement onto the blocking member, for moving it between the blocking and non-blocking positions. Examples are a translational movement along a vertical axis of the lock housing, a translational movement along a horizontal axis of the lock housing, or other direction, depending on the construction of the relevant parts, i.e. the blocking member and the operation part. In other embodiments, or in combination, a blocking member may be provided which can block the movement by engaging another part of the lock assembly, such as for example a part of the motion transfer mechanism and/or a part of the latch.

In the embodiment shown in the drawings, the blocking member 20 may be provided with a magnet 24 on one of its wings 25. The purpose of this magnet is to enable movement of the blocking member 20 in cases of power failure, for example by means of an appropriately placed external magnet which is brought into proximity of the lock assembly. In this way, an alternative, safer, mechanism for unlocking the lock assembly in case of power failure may be achieved.

Motion Transfer Mechanism

The motion transfer mechanism is the combination of components or parts which together achieve that the movement of the operation part 14 is mechanically transferred onto the latch 15, such that the user operation of the operation part 14 results in a movement of the latch 15 from the locked to the unlocked position. The resilient member (torsion spring) 16 biases the latch towards the locked position. In other words, the resilient member 16 is provided for moving the latch from the unlocked position back to the locked position and, as a result, the operation part back to its initial position.

Figure 3A:
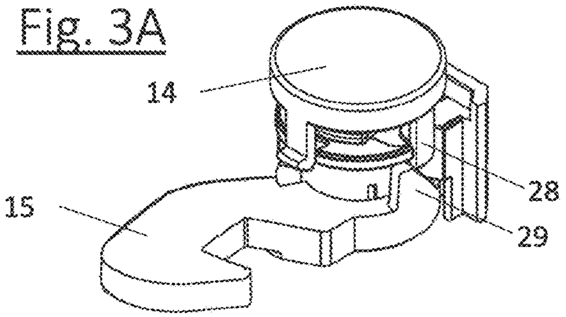
FIGS. 3A and 3B show views of parts of an electronic lock assembly with the operation part in the initial position and the latch in the locked position.
Figure 4A:
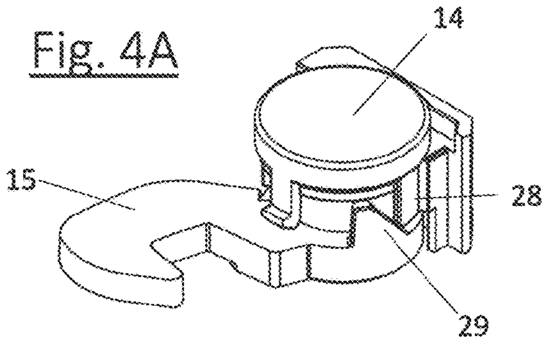
FIGS. 4A and 4B show views of parts of an electronic lock assembly with the operation part in a depressed position and the latch in the unlocked position.
Figure 3B:
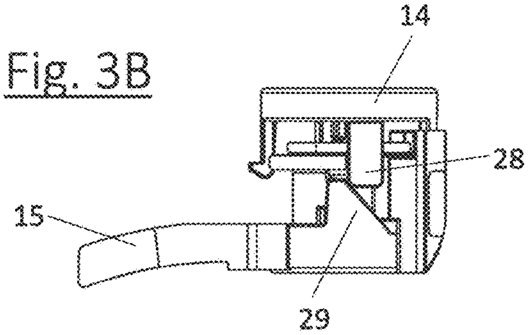
Figure 4B:
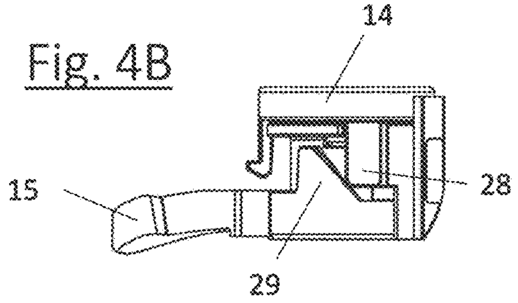

In the embodiment shown in the drawings, see FIGS. 3-4, the motion transfer mechanism comprises a pair of legs 28, which are integral parts of the operation part 14, and sloping parts 29, which are integral parts of the latch. As shown, when the operation part 14 is pushed down, the legs 28 push onto the sloping parts 29 and thereby cause the latch 15 to rotate. This principle of converting a translational movement of a push button into a rotational movement of a latch is known in the art and will therefore not be described in great detail here.

In the embodiment shown, the components of the motion transfer mechanism are integral parts of the operation part 14 and the latch 15. This is not essential. The motion transfer mechanism may comprise one or more intermediate parts, i.e. not integral with the operation part or the latch, but interacting with them in order to transfer motion from the one to the other.

In the embodiment shown, the operation part 14 is a push button which is pushed down in order to operate the lock. In other embodiments, the operation part 14 may also be another element which is for example provided to be rotated in order to operate the lock. In embodiments, the operation part may also be provided for receiving a mechanical key or insert, which the user needs to apply in order to operate the lock.

Compact Construction

Figure 11:
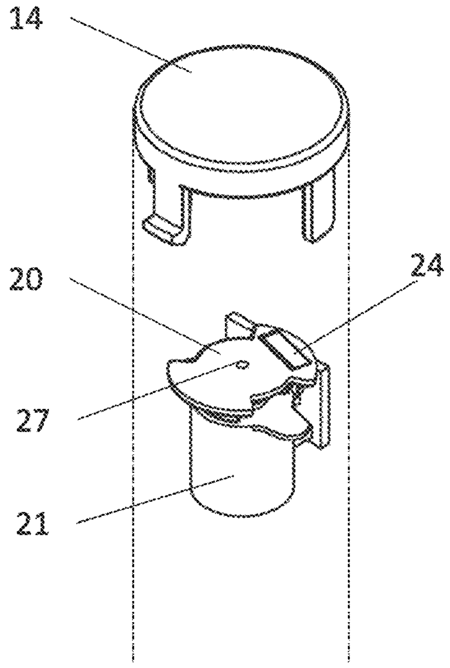
FIG. 11 shows how the blocking mechanism according to the disclosure may fit inside the volume of the operation part.

In preferred embodiments, the blocking mechanism, preferably comprising the blocking member 20 and the electric motor 21, may be provided in a void underneath the operation part and, preferably, inside the volume of the body portion 13 of the lock housing 11. More preferably, see FIG. 11, the blocking mechanism, i.e. the blocking member and its electric drive means, are located underneath the operation part 14 and are entirely contained within the footprint of the operation part 14, which is provided in the central opening of the lock housing. In this way, a compact construction of the lock assembly may be achieved and/or it may be achieved that the lock assembly, including the (remotely controllable) blocking means, can be inserted into an existing hole in the wall of a dispenser housing, or in other words that existing dispensers can be retrofitted with a new lock assembly according to the present disclosure.

In the embodiments shown in the drawings, the central opening in the lock housing 11 defines a cylindrical volume, and the blocking member 20 and the electric motor 21 are provided within said cylindrical volume, i.e. entirely contained therein. In other words, the operation part 14, which fits into the central opening, is a circular push button and the blocking member 20 and the electric motor 21 are entirely contained underneath and within the surface area of this circular push button.

In embodiments, the push button or operation part may also have another shape than circular. More generally, the footprint of the operation part, or the cross-sectional area of the central opening in the lock housing, may define a volume inside the lock housing, and it is preferred that the blocking member and its electric drive means such as the electric motor are entirely contained in this volume. With the footprint of the operation part is meant the area of the top surface of the operation part or the size (diameter/dimensions) of the central opening in the lock housing. This may contribute to the compactness and the ability of retrofitting existing dispensers with the new lock assembly.

In the embodiments shown in the drawings, the drive shaft 27 of the electric motor 21 is oriented perpendicular to the top surface of the push button, or parallel to a movement axis of the push button, and the blocking member 20 is mounted on the drive shaft of the electric motor. In this way, the blocking member and the electric motor can be mounted closely underneath the push button, and a simple and compact construction may be achieved.

In embodiments, the lock assembly, in particular the body portion 13 of the lock housing 11, may have predetermined dimensions for insertion into a hole of a given size, such that existing dispensers can be retrofitted with the lock assembly. In the embodiments shown in the drawings, the body portion is sized for insertion into such a hole, whereas the top portion 12 of the lock housing 11 is wider so that it remains on the outside of the opening in the dispenser housing. As shown in FIGS. 1 and 2, resilient parts, such as wings 39, may be provided on the outer wall of the lock housing 11 so that it can be snap fitted into an opening in a wall of a dispenser housing. The wings 39 are provided to give way when the lock housing is pushed through the opening and snap back into their original position when the lock housing is in place, such that the wall of the dispenser housing is held between the top portion 12 and the wings 39.

The capability of retrofitting is further achieved by providing the further housing 18 which contains the power and communication means, i.e. a more bulky part of the electronic lock assembly, and the cable 19 for connecting the lock housing 11 with the further housing 18 and transferring the electric power and communication signals. In this way, assembly of the lock and/or mounting the lock assembly on the dispenser may also facilitated, because the unit comprising the lock housing, the operation part and the latch can be mounted in a separate step, or steps, on the dispenser housing, separate from the mounting of the further housing.

It suffices to connect the cable afterwards, in order to enable the transfer of power and communication signals. Also, the use of space inside the dispenser housing may be optimized, because the part containing the power source (e.g. batteries), which is usually more bulky, can be mounted spaced from the position of the lock. Further, the location of the further housing in the dispenser housing may be chosen so as to optimize the connection for the wireless communication.

Cable Connection

In embodiments as shown in the drawings, the connection of the cable interface 22 onto the lock housing 11 may be a releasable connection. In embodiments, a snap gripping member 23 such as a resilient hook may be provided on the end of the cable comprising the interface, for fixing the position of the interface on the lock housing.

See FIG. 8A-B and FIG. 12A-B. The cable end which comprises the interface 22 for connecting to the lock housing 11 also comprises a snap gripping member (resilient hook) 23 which is provided on a side of the cable end and protrudes forwards with respect to the interface 22. The interface 22 fits into a slot 30 on one side of the lock housing 11 and the snap gripping member 23 is provided to engage around a part of the lock housing 11 and behind a ridge 31 on the opposite side of the lock housing. The cable interface 22 comprises a number of contact pads 37. In the slot 30, corresponding contacts, in particular spring fingers 36 are provided for contacting the contact pads 37 and thereby interfacing the cable interface with the electric motor 21, so that electric power and control signals can be transferred. The cable interface 22 can be disconnected from the lock housing 11 by pulling back the snap gripping member 23 and disengaging it from the ridge 31.

In other embodiments, the snap connection or snap gripping member may also be carried out in many different ways to provide a releasable connection of the cable interface onto the lock housing. In embodiments, the interface and/or the snap gripping member may follow a guiding track in or on the lock housing to facilitate that the contact pads on the cable interface find the right position before engaging with corresponding contacts in the slot of the lock housing.

The contacts on the motor side, in particular the spring fingers 36, are preferably provided on an interface board 38 which is connected to the motor. The microswitch 35 may also be provided on this interface board 38.

In the embodiment shown in the drawings, the cable interface 22 connects to the second portion 17 of the body portion of the lock housing, onto which the electric motor 21 is pre-assembled (see below). In other embodiments, the cable interface may also connect to the main part of the body portion 13 of the lock housing.

In the embodiment shown in the drawings, the controller and the transceiver are provided in the further housing 18. In other embodiments, the controller and the transceiver may also be provided in or on the lock housing 11. In this case, the cable could be a simple power cable, i.e. only transferring power from the power supply to the components in the lock housing.

In embodiments, the lock housing and the further housing could also be a single unit, i.e. a single housing comprising the parts of the lock assembly as well as the power supply, controller and transceiver.

Method of Assembling

In embodiments as shown in the drawings, the lock assembly 10 may have a body portion 13 composed of at least two parts, for example a first part and a second part, wherein the first part is a main part 13 which may be integral with the top portion 12 of the lock housing 11 and the second part 17 is fixable onto the first part. The first and second parts together form a cylindrical volume on the inside of the lock housing 11, wherein the operation part 14, the blocking member 20 and the electric motor 21 are contained (see also FIG. 11). As shown, the second part 17 comprises in itself a cylindrical portion for holding the electric motor 21 and a straight portion attached thereto, wherein on the inside a slot is provided for receiving and holding an interface which is provided on the side of the electric motor, and on the outside a slot 30 is formed for receiving and holding the cable interface 22, in such a way that the interfaces connect to each other (see also FIG. 8).

In the embodiments shown, the second part 17 of the lock housing 11 is used for pre-assembling at least the latch 15, the resilient member (torsion spring) 16, the electric motor 21 and the blocking member 20. This means that the latch, the spring, the electric motor and the blocking member are first assembled on this second part 17 of the lock housing and that the resulting combination of parts are subsequently mounted—together, as a single unit—on the first part 13 of the lock housing. In particular, the latch 15 passes through a slot 32 in the main part 13 of the lock housing and the second part 17 is then fixed to the main part 13, for example by means of a snap connection or other mechanical connection, such as for example by means of screws, adhesive or other.

Figure 13:
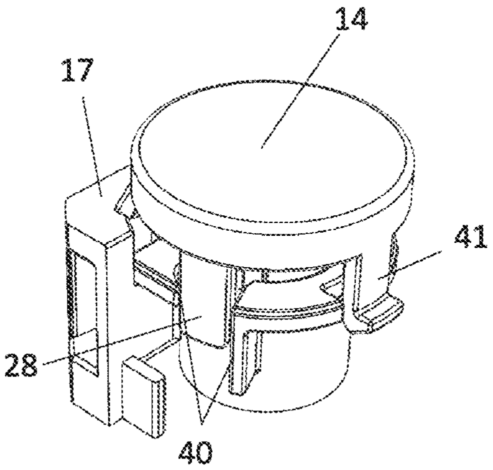
FIGS. 13 and 14 show how the operation part may fix two parts of the lock housing to each other.
Figure 14:
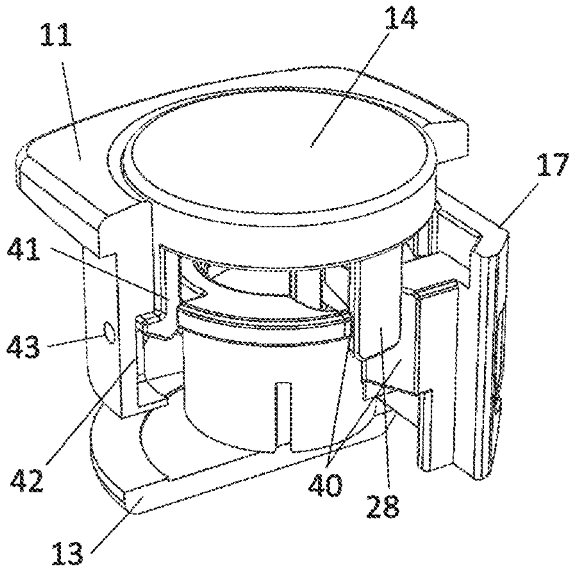

In the embodiments shown, see in particular FIGS. 13 and 14, the first and second parts of the lock housing are preferably fixed to each other by means of the operation part. This means that the first and second parts 13, 17 fit into or onto each other, but that their position into or onto each other is only fixed by assembling the operation part 14 with the lock housing 11, in particular by inserting the operation part 14 into the central opening provided in the lock housing 11. In other words, when the operation part 14 is placed in the central opening of the lock housing, the operation part holds the first and second parts 13, 17 together. This means that the second part 17 (and the parts pre-assembled onto it) cannot be removed from the first part 13 without removing the operation part 14.

In the embodiments shown, in order to fix the two parts 13, 17 together, the operation part 14 comprises a pair of legs 28 which slide into corresponding slots, between ridges 40, in the second part 17 of the lock housing and thereby prevent the second part from being removed from the lock assembly. These legs 28 also function as part of the motion transfer mechanism, as described elsewhere herein. The operation part is snap-fitted into the lock housing by means of another pair of legs, the resilient legs 41, which snap-fit into complementary grooves 42 in the first part of the lock housing. A hole 43 is provided in the wall of the housing for releasing the resilient legs 41 from the grooves 42 and removing the operation part 14 from the central opening in the lock housing 11, so that the two parts 13, 17 can be separated from each other, if necessary.

In this way, as assembly structure is achieved by which assembly of the lock assembly may be facilitated and a simple construction may be achieved.

FIG. 7A-D shows the sequence of the assemblage of the electronic lock assembly. The method comprises the steps of: pre-assembling the latch 15, the resilient member 16, the electric motor 21 and the blocking member 20 on the second part 17 of the lock housing 11, thus forming a pre-assembled unit (see FIGS. 7A-B); assembling the pre-assembled unit to the first part 13 of the lock housing 11 (See FIG. 7C); inserting the operation part 14 into the central opening of the top portion 12 and fixing the cable 19. Upon assembling the lock assembly onto a wall of a dispenser housing, the assembled first and second parts 13, 17 of the lock housing 11 may be first inserted through the appropriate opening in the wall, before the cable 19 is connected.

The further housing 18 can be mounted in an appropriate position inside the dispenser housing. The cable 19 may be permanently connected to the further housing 18, so that a final step is connecting the cable interface 22 onto the lock housing 11 by means of the snap gripping member 23.

Controller

Figure 9:
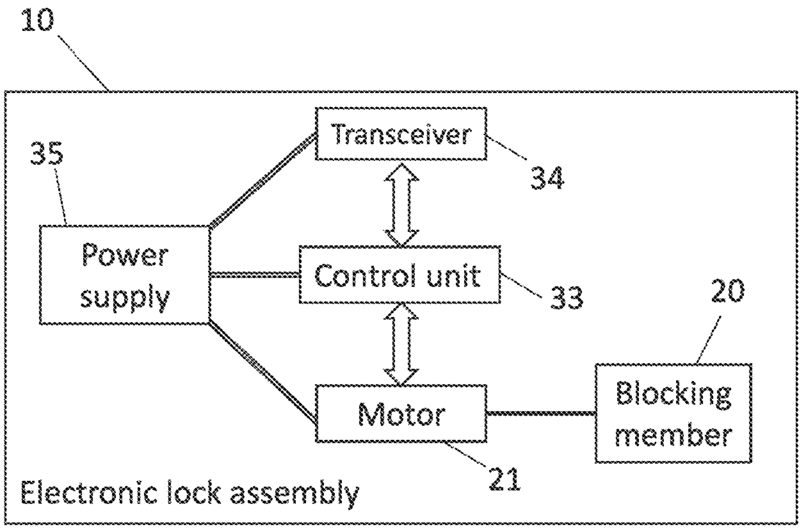
FIG. 9 shows a schematic overview of the parts of the electronic lock assembly and their interactions.

In embodiments according to the disclosure, the electronic lock assembly 10 may comprise a controller or control unit 33 for controlling the electric motor 21 or other electric actuator and thereby the blocking or unblocking of the lock assembly. FIG. 9 schematically shows the electronic lock assembly. A transceiver 34 may be provided communication with an external server, gateway, central control unit or the like. A power supply 35, for example comprising one or more batteries, provides electric power to the transceiver, the control unit and the motor. The control unit is provided for processing signals received via the transceiver and controlling the motor 21 accordingly. The motor 21 may advantageously be a stepper motor with an encoder, so that feedback on the position of the motor is provided to the control unit 33. Alternatively, or in combination, feedback on the position of the blocking member 20 may be obtained by means of a sensing means, such as for example the microswitch 35 shown in the drawings. The control unit 33 may further be provided for communicating data to an external server, gateway, central control unit or the like.

In embodiments shown in the drawings, the control unit 33, the transceiver 34 and the power supply are provided in the separate, further housing 18, but this is not essential. All the components of the electronic lock assembly 10 may also be incorporated into a single housing, or, for example, only the power supply may be provided in the further housing 18.

In an embodiment, the operation of the electronic lock assembly may be as follows. Via the transceiver 34, the control unit 33 receives an instruction for unlocking the dispenser, for example an unlock signal. Thereupon, the control unit 33 interprets the instruction and controls the electric motor 21 accordingly. For example, the control unit 33 compares the received unlock signal to a prestored value and upon determining that the unlock signal matches the prestored value controls the electric motor 21 to move the blocking member 20 from the blocking position to the non-blocking position.

In any embodiment described herein, the transceiver 34 may be configured for communicating wireless communication signals, such as for example WiFi, any type of mobile communication signals such as 3G, 4G, 5G or other, or short-range wireless communication which uses signals that travel from a few centimeters to several meters. Examples of suitable short-range wireless communication standards are Bluetooth®, Bluetooth® Low Energy, infrared, radio frequency communication, near field communication, ultra-wideband and Zigbee®.

The unlock instruction or signal may for example be received from a remote unit, or obtained by scanning or reading an electronic key which is held in the vicinity of the dispenser. The electronic key may be any kind of electronic key, such as for example a smart card, an RFID tag, a token, or the like, possibly an electronic key incorporated on or displayed on a smartphone or other electronic device. The control unit 33 may be provided for comparing the unlock instruction or signal to for example a prestored value representative of the "unlock" instruction or one or more prestored values representative of authorised person(s), for example the ID code(s) of person(s) who are allowed access to the dispenser. Upon determining that there is a match, i.e. that the dispenser may be unlocked, the control unit 33 operates the electric motor 21 or actuator to move the blocking member 20 from the blocking position to the non-blocking position.

Next, the control unit 33 may operate the electric motor 21 to move the blocking member 20 from the non-blocking position to the blocking position and thereby lock the dispenser housing. The control unit 33 may perform this operation upon receipt of a lock instruction or signal via the transceiver 34, or upon lapse of a predetermined length of time of for example a few minutes, for example a time period between 1 and 5 minutes, preferably between 1 and 3 minutes. Such a time period may be chosen depending on an estimated time needed for refilling the dispenser with the dispensable product.

Figure 10:
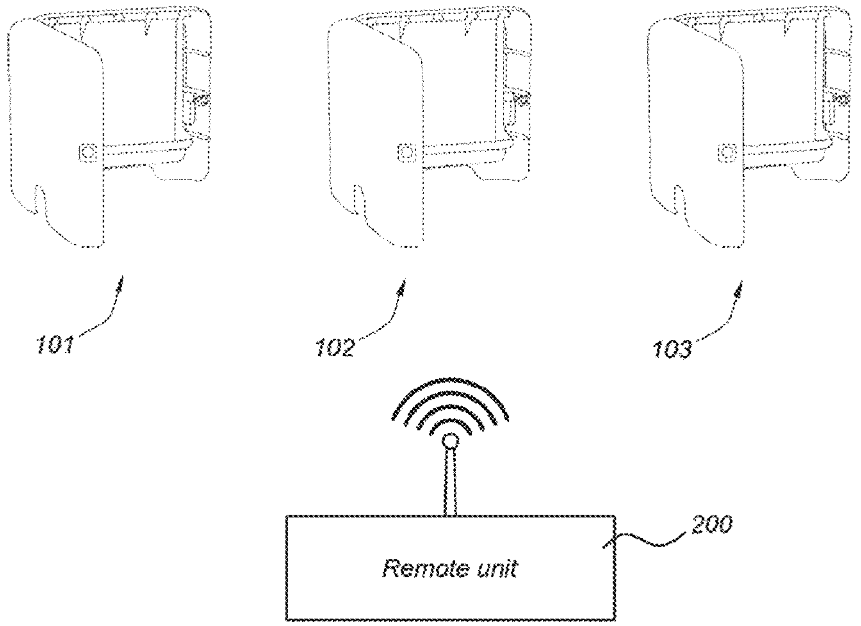
FIG. 10 shows a schematic view of a system comprising a central controller and a plurality of dispensers with electronic lock assemblies according to the disclosure.

FIG. 10 shows a schematic view of an embodiment of a system comprising a remote unit 200 and a plurality of dispensers 101, 102, 103. The dispensers may be for the same dispensable product or for different dispensable products. The remote unit 200 is configured for transmitting at least the unlock instruction or signal to the dispensers 101, 102, 103. The remote unit 200 may for example be an electronic key reader, configured for transmitting the unlock signal to the dispensers upon detecting an authorized electronic key, i.e. an electronic key which matches an authorization to access the dispensers. This obviates the need to provide a key reader or the like in every dispenser. In a certain room or area, one remote unit 200 may be provided which controls access to a number of dispensers within that particular room or area. The remote unit 200 may in itself be integrated in a dispenser.

In particular embodiments, the remote unit 200 may be further configured for transmitting a lock signal to the dispensers 101, 102, 103. The remote unit 200 may be configured for transmitting the lock signal upon detecting the authorized electronic key a second time, i.e. when the user applies his/her electronic key once more to the remote unit/key reader. In specific embodiments, the remote unit 200 may be configured for transmitting the unlock signal upon detecting the presence of the electronic key and for transmitting the lock signal upon detecting removal of the electronic key, which means that the electronic key needs to be present on the remote unit as long as access to the dispensers 101, 102, 103 is desired. In certain embodiments, the remote unit 200 may be configured for transmitting the lock signal to the dispensers 101, 102, 103 for a predetermined length of time, for example a time period between 1 and 15 minutes, preferably between 3 and 10 minutes, after transmission of the unlock signal. Such a time period may be chosen depending on an estimated time needed for refilling the dispensers 101, 102, 103 with their respective dispensable product.

The remote unit 200 may be configured for communicating with a server system or central management system or the like and may receive instructions from such system to unlock and/or lock the dispensers 101, 102, 103.

It is foreseen that the embodiments described herein may be used in combination with and/or for use in a dispenser, and more particularly a dispenser comprising a dispenser housing having an interior volume adapted for holding a dispensable product, such as, but not limited to, paper towel products, soaps, paper tissues, and the like. It is further envisioned that such dispensers have an openable portion to provide access to the interior such that the dispensable product may be refilled and/or removed periodically, either in part or in its entirety.

It is to be understood that the disclosure herein is not limited to the embodiments described above but may be varied within scope as consistent with the spirit of the disclosure.

The invention claimed is:

1. A lock assembly, comprising:

a lock housing comprising:

a first portion which is configured to be mounted in an opening in a dispenser housing so as to lock an openable part of the dispenser housing, and a body portion which extends in a first direction with respect to the first portion;

an operation part which is movably mounted in or on the lock housing, wherein the operation part is operable by a user for unlocking the lock assembly;

a blocking member, provided for blocking movement of a part of the lock assembly such that unlocking of the lock assembly by user operation of the operation part is prevented, wherein the blocking member is movable between a non-blocking position, in which unlocking of the lock assembly by user operation of the operation part is enabled, and a blocking position, in which the blocking member blocks the movement of said operation part of the lock assembly; and an electric motor for driving the movement of the blocking member between the non-blocking position and the blocking position;

wherein the blocking member and the electric motor are included in a void underneath the operation part; and wherein the operation part is a push button movable in a movement path and having at least one stop surface facing in the first direction, wherein in the non-blocking position the blocking member is positioned out of the movement path of the at least one stop surface, and wherein in the blocking position the blocking member is positioned in the movement path of the at least one stop surface.

2. The lock assembly according to claim 1, wherein the operation part takes up, or defines, a certain volume inside the lock housing and wherein the electric motor and the blocking member are contained within said volume.

3. The lock assembly according to claim 1, wherein a footprint of the operation part defines a volume inside the body portion and wherein the blocking member and the electric motor are provided within said volume.

4. The lock assembly according to claim 1, further comprising:

a latch which is movably mounted in the body portion of the lock housing, the latch being movable from a locked position to an unlocked position as a result of a user operation of the operation part for unlocking the lock assembly;

a resilient member which biases the latch towards the locked position; and a motion transfer mechanism, provided for mechanically transferring motion of the operation part to the latch, such that the user operation of the operation part results in the movement of the latch from the locked position to the unlocked position.

5. The lock assembly according to claim 4, wherein the blocking member is provided for blocking movement of at least one of the operation part, the latch, and a part of the motion transfer mechanism.

6. The lock assembly according to claim 1, wherein the blocking member is a rotatable member positioned underneath the operation part.

7. The lock assembly according to claim 6, wherein the blocking member comprises at least one magnetic element.

8. The lock assembly according to claim 1, wherein the operation part includes at least two stop ribs which are configured to block movement of the part of the lock assembly by contacting opposite edges of the blocking member when the blocking member is in the blocking position.

9. The lock assembly according to claim 1, wherein the operation part is configured to move in the first direction into the body portion to unlock the lock assembly.

10. A lock assembly, comprising:

a lock housing comprising:

a first portion which is configured to be mounted in an opening in a dispenser housing so as to lock an openable part of the dispenser housing, and a body portion which extends in a first direction with respect to the first portion;

an operation part which is movably mounted in or on the lock housing, wherein the operation part is operable by a user for unlocking the lock assembly;

a blocking member, provided for blocking movement of a part of the lock assembly such that unlocking of the lock assembly by user operation of the operation part is prevented, wherein the blocking member is movable between a non-blocking position, in which unlocking of the lock assembly by user operation of the operation part is enabled, and a blocking position, in which the blocking member blocks the movement of said operation part of the lock assembly; and an electric motor for driving the movement of the blocking member between the non-blocking position and the blocking position;

wherein the blocking member and the electric motor are included in a void underneath the operation part wherein the operation part is a push button having at least one stop surface facing downwards and wherein the blocking member is a rotatable member having at least one blocking protrusion, wherein in the non-blocking position of the blocking member the at least one blocking protrusion is positioned out of a movement path of the at least one stop surface, and wherein in the blocking position of the blocking member the at least one blocking protrusion is positioned into the movement path of the at least one stop surface.

11. A lock assembly, comprising:

a lock housing comprising:

a first portion which is configured to be mounted in an opening in a dispenser housing so as to lock an openable part of the dispenser housing, and a body portion which extends in a first direction with respect to the first portion;

an operation part which is movably mounted in or on the lock housing, wherein the operation part is operable by a user for unlocking the lock assembly;

a blocking member, provided for blocking movement of a part of the lock assembly such that unlocking of the lock assembly by user operation of the operation part is prevented, wherein the blocking member is movable between a non-blocking position, in which unlocking of the lock assembly by user operation of the operation part is enabled, and a blocking position, in which the blocking member blocks the movement of said operation part of the lock assembly; and an electric motor for driving the movement of the blocking member between the non-blocking position and the blocking position;

wherein the blocking member and the electric motor are included in a void underneath the operation part wherein the electric motor has a drive shaft oriented perpendicular to a first surface of the operation part and wherein the blocking member is mounted on the drive shaft of the electric motor.

12. The lock assembly according to claim 1, wherein the electric motor is a stepper motor.

13. The lock assembly according to claim 1, wherein the body portion of the lock housing has predetermined dimensions for insertion into a hole of a dispenser housing of a given size.

14. The lock assembly according to claim 1, wherein the lock assembly comprises a further housing which contains power and communication means and a cable for connecting the lock housing with the further housing and transferring electric power and communication signals.

15. The lock assembly according to claim 14, wherein the cable comprises an interface for connecting to the lock housing.

16. The lock assembly according to claim 15, wherein the connection of the cable interface onto the lock housing is a releasable connection.

17. The lock assembly according to claim 16, wherein a snap gripping member is provided on the end of the cable comprising the interface, for fixing the position of the interface on the lock housing.

18. The lock assembly according to claim 1, further comprising a controller for controlling the operation of the electric motor and thus the position of the blocking member.

19. The lock assembly according to claim 1, wherein the body portion is composed of at least two parts, of which a first part is a main part which is integral with the first portion of the lock housing and of which a second part is fixable onto the first part and is provided for receiving or pre-assembling at least the electric motor and the blocking member.

20. The lock assembly according to claim 19, wherein the first and second parts are fixed to each other by means of the operation part.

21. A dispenser comprising a dispenser housing having an interior volume for holding a dispensable product, the dispenser housing having an openable part to provide access to the interior volume for refilling the dispensable product, and the lock assembly according to claim 1 for locking the openable part.

22. The dispenser according to claim 21, wherein the first portion of the lock housing is mounted on an outside of an opening in the dispenser housing and wherein the body portion of the lock housing is dimensioned such that it can pass through said opening.

23. A method of retrofitting a dispenser with an electronic lock assembly according to claim 1, comprising the steps of removing a lock from the dispenser housing, thereby clearing an opening in the dispenser housing, and mounting the electronic lock assembly in the opening.

24. The method of claim 23, wherein the lock assembly comprises a further housing which contains power and communication means and a cable for connecting the lock housing with the further housing and transferring electric power and communication signals, and wherein the method further comprises the step of mounting the further housing inside the dispenser housing.

25. The method of claim 24, wherein the connection of a cable interface of the cable onto the lock housing is a releasable connection and comprises a snap gripping member for fixing the position of the cable interface on the lock housing, and wherein the method further comprises the step of connecting the cable interface onto the lock housing by means of the snap gripping member.

26. A method of assembling an electronic lock assembly according to claim 1, wherein the body portion of the lock housing is composed of at least two parts, of which a first part is a main part and a second part is fixable onto the first part, wherein the method comprises the steps of:

(a) pre-assembling at least the electric motor and the blocking member on the second part of the body portion, thus forming a pre-assembled unit;

(b) assembling the pre-assembled unit to the first part of the body portion; and (c) fixing the first and second parts to each other by assembling the operation part on the lock housing.

* * * * *